(12) United States Patent
Bao (10) Patent No.: US 12,529,174 B2
(45) Date of Patent: Jan. 20, 2026

(54) HIGH-CONCEALMENT GAUZE PROCESSING TECHNOLOGY

(71) Applicant: ZHEJIANG NINE BULLS CRAFTS CO., LTD, Zhejiang (CN)

(72) Inventor: Pan Bao, Zhejiang (CN)

(73) Assignee: ZHEJIANG NINE BULLS CRAFTS CO., LTD, Taizhou (CN)

( * ) Notice: Subject to any disclaimer, the term of this patent is extended or adjusted under 35 U.S.C. 154(b) by 231 days.

(21) Appl. No.: 18/239,130

(22) Filed: Aug. 29, 2023

(65) Prior Publication Data

US 2025/0051984 A1  Feb. 13, 2025

(30) Foreign Application Priority Data

Aug. 7, 2023 (CN) .......................... 202310987500.8

(51) Int. Cl.
| | | |
|---|---|---|
| *D06B 1/02* | (2006.01) | |
| *D06B 19/00* | (2006.01) | |
| *D06B 23/02* | (2006.01) | |
| *D06C 7/00* | (2006.01) | |
| *D06M 15/71* | (2006.01) | |

(52) U.S. Cl.
CPC ........... *D06B 1/02* (2013.01); *D06B 19/0017* (2013.01); *D06B 23/02* (2013.01); *D06C 7/00* (2013.01); *D06M 15/71* (2013.01); *D10B 2505/18* (2013.01)

(58) Field of Classification Search
None
See application file for complete search history.

(56) References Cited

U.S. PATENT DOCUMENTS

| | | | | |
|---|---|---|---|---|
| 4,490,428 A | * | 12/1984 | Long ..................... | B29B 15/122 |
| | | | | 474/271 |
| 2001/0017102 A1* | | 8/2001 | Caldwell .............. | D04H 1/4266 |
| | | | | 156/229 |

FOREIGN PATENT DOCUMENTS

| | | | | | |
|---|---|---|---|---|---|
| CN | 111013924 A | * | 4/2020 | .......... | B05D 3/0406 |
| CN | 212167945 U | * | 12/2020 | | |
| EP | 0025318 A1 | * | 3/1981 | ............. | D06B 1/146 |

* cited by examiner

*Primary Examiner* — Jose I Hernandez-Kenney (57) ABSTRACT

The present invention relates to the field of reticular material processing technology, in particular to a high-concealment gauze processing technology, which comprises the following steps: S1, gauze cleaning; S2, surface treatment; S3, evenly coating; S4, thermocuring treatment; S5, cooling treatment and S6, cutting and trimming. S3, S4 and S5 are completed with an integrated device, and the integrated device comprises a mounting plate, a side plate, a coating mechanism, a curing mechanism and a cooling mechanism. The two coating rollers drive the corresponding coating brushes to evenly coat the gauze between the two brushes under the operation of the driving unit; the coating rollers rotate and drive the coating brushes to uniformly brush the paint on the gauze, so as to avoid reduction of the service life of the gauze due to patchy coating on the gauze under the action of gravity.

7 Claims, 5 Drawing Sheets

HIGH-CONCEALMENT GAUZE PROCESSING TECHNOLOGY

CROSS REFERENCE TO RELATED APPLICATIONS

The present application claims the benefit of Chinese Patent Application No. 202310987500.8 filed on Aug. 7, 2023, the contents of which are incorporated herein by reference in their entirety.

TECHNICAL FIELD

The present invention relates to the field of gauze processing technology, in particular to a high-concealment gauze processing technology.

BACKGROUND ART

High-concealment gauze is a kind of reticular material featured by concealment, protection, filtration, insect prevention and ventilation. It is mainly used to protect and isolate specific areas or objects, and is widely used in the tent field owing to its high performance. Since it long-time contacts with external substances to play the protective role, we spray a coating on its surface in the production process to slow down the corrosion of its internal materials and prolong its service life, In the current processing of high-concealment gauze, we clean the formed gauze first, then spray the surface with paint, cure it in an oven to form a protective coating, and finally cut and trim it to the required size and shape.

However, there are the following problems in the current processing: 1. When the paint is sprayed on the gauze and transported to the baking equipment for baking, the coating on the surface of the gauze gathers into droplets under the action of its own gravity, and the upper part of the gauze is not attached with paint, which easily leads to the incomplete coating after subsequent curing, that is, the protection effect on the internal materials of the gauze is discounted, and the service life of the gauze is reduced.

2. The gauze needs to be baked in a high-temperature environment after coating. When the curing is finished, directly cutting and trimming the high-temperature gauze is prone to cause damage to it.

SUMMARY OF THE INVENTION

The present invention provides a high-concealment gauze processing technology, in order to overcome the deficiencies in the prior art that the coating formed after curing is incomplete, which leads to reduced protective effect on the internal materials of the gauze, and that the gauze is easily damaged when it is directly cut and trimmed due to the high temperature after curing.

The present invention provides a high-concealment gauze processing technology, which comprises the following steps:

S1. gauze cleaning: cleaning the formed high-concealment gauze to remove dust, dirt or impurities attached to it;

S2. surface treatment: paint spraying the surface of the high-concealment gauze cleaned in step S1 to improve its water resistance and corrosion resistance;

S3. evenly coating: evenly coating the high-concealment gauze sprayed with paint in step S2, so that the paint is evenly sprayed on the high-concealment gauze to ensure the integrity of the coating;

S4. thermocuring treatment: sending the high-concealment gauze after the surface treatment in step S3 into an oven for thermocuring treatment at the specified temperature for the specified time, which is conductive to enhancing the strength and stability of the high-concealment gauze;

S5. cooling treatment: cooling the high-concealment gauze after the thermocuring treatment in step S4 to facilitate the subsequent cutting and trimming;

S6. cutting and shaping: cutting and shaping the high-concealment gauze cooled in step S5 by using a cutting mechanism to obtain the high-concealment gauze with the required size and shape;

wherein S3, S4 and S5 are completed with an integrated device, and the integrated device comprises:

a mounting plate, wherein the two mounting plates are symmetrically arranged in front and back, and a side plate is fixedly arranged between the two mounting plates;

a coating mechanism, wherein the coating mechanism for uniformly coating the gauze is arranged between the two mounting plates, and the coating mechanism is located on the left side of the side plate;

a curing mechanism, wherein the side plate is provided with the curing mechanism;

a cooling mechanism, wherein the cooling mechanism is arranged between the two mounting plates and is located on the right side of the side plate;

the coating mechanism comprises a base plate, and the U-shaped base plate is fixedly arranged between the two mounting plates through a fixing block, with the U-shaped opening of the base plate facing upwards, the opposite faces of the two mounting plates are both provided with a No.1 lifting groove, and an electric slider I is slidably arranged in the No.1 lifting groove, a U-shaped hold-down plate is fixedly arranged between the two electric sliders I, with the U-shaped opening of the hold-down plate facing downwards, the opposite surface of the vertical part of the base plate and the opposite surface of the vertical part of the hold-down plate are both provided with a traverse groove, a No.1 L-shaped plate is slidably arranged in the traverse groove on the base plate through an electric slider II, a traverse plate is slidably arranged in the traverse groove on the hold-down plate through a traverse block, and a No.2 L-shaped plate is arranged on the opposite surfaces of the two traverse plates, and a coating shaft is rotatably arranged between the two No.1 L-shaped plates and between the two L-shaped plates, a coating roller is fixedly sleeved on the coating shaft, and a coating brush is fixedly arranged on the coating roller.

Based on beneficial embodiment, a matching group is arranged on the traverse plate, and the matching group comprises a slider groove, the opposite surfaces of the two traverse plates are both provided with slider grooves, and the slider groove is connected with the corresponding No.2 L-shaped plate through a slider, two movable columns distributed left and right are movably installed on the upper end face of the traverse plate, a rectangular plate is jointly and fixedly arranged on the upper end faces of the two movable columns, a spring is jointly and fixedly arranged between the rectangular plate and the No.2 L-shaped plate directly below, the left end face of the traverse plate is provided with a threaded groove, and the threads in the threaded groove is matched with a limit bolt for fixing the moving column, and a synchronization column is fixedly arranged between the two rectangular plates.

Based on beneficial embodiment, a driving group is jointly arranged between the two coating shafts, and the driving group comprises a driving gear, the coating shaft are located on the front side of the No.1 L-shaped plate or the No.2 L-shaped plate, and is sleeved with the driving gear, a rack plate is fixedly arranged at the rear end face of the vertical part at the front side of the base plate through two Z-shaped plates distributed left and right, the rack plate are provided with teeth on the upper and lower end faces that mesh with the corresponding driving gear, and a telescopic rod is fixedly arranged between the traverse plate and the No.1 L-shaped plate directly below it.

Based on beneficial embodiment, an auxiliary group is arranged on the hold-down plate, and the auxiliary group comprises a supporting roller, the U-shaped area of the hold-down plate is rotatably arranged with two supporting shafts distributed left and right, and the supporting shafts are fixedly sleeved with the supporting rollers for supporting the gauze, the right end face of the hold-down plate is fixedly provided with a U-shaped baffle, the lower end faces of the U-shaped area of the hold-down plate are two inclined faces which are symmetrical in front and back, and both are inclined towards the middle area, the lower end face of the U-shaped area of the hold-down plate is provided with a collection groove, and the collection groove inclines upward from left to right, and the left end face of the hold-down plate is fixedly provided with a collection box which matches the collection groove.

Based on beneficial embodiment, the curing mechanism comprises a rotating drum, and the side plate is rotatably arranged with the horizontally placed cylindrically shaped rotating drum, two curing groups are fixedly arranged on the inner wall of the rotating drum, and the two curing groups are located on both sides of the side plate respectively, and the curing groups include a plurality of heating plates evenly distributed circumferentially, and the left heating plates outnumber the right heating plates, the right end surface of the side plate is rotatably provided with a gear shaft, and a transmission gear is fixedly sleeved on the gear shaft, and the rotating drum is circumferentially and fixedly provided with a circle of rotating teeth which are meshed with the transmission gear.

Based on beneficial embodiment, the two mounting plates are fixedly arranged with the two placing plates distributed left and right, and the two placing plates are located on both sides of the rotating drum, the opposite faces of the two placing plates are fixedly provided with two mounting blocks which are symmetrical in front and back, and the two mounting blocks symmetrical in front and back are jointly and rotatably provided with a rotating shaft, the rotating shaft is fixedly sleeved with two rotating rollers which are symmetrical in front and back, and the left and right rotating rollers are jointly provided with a high-temperature resistant conveyor belt, and the outer side surface of the conveyor belt is fixedly provided with a plurality of separation strips arranged at equal distances.

Based on beneficial embodiment, the cooling mechanism comprises a bottom plate, the two mounting plates are arranged in between with two bottom plates which are symmetrical up and down, and the lower bottom plate is fixedly connected with the mounting plate through a rectangular block, the opposite faces of the two mounting plates are both provided with a No.2 lifting groove, and an electric slider III is slidably arranged in the No.2 lifting groove, the two electric sliders are fixedly connected with the upper bottom plate through a connecting block, the bottom plate has an internal cavity structure, the opposite faces of the two bottom plates are provided with a plurality of through grooves communicating with the corresponding cavities, and the upper and lower through grooves are staggered, and the opposite surfaces of the two bottom plates are fixedly provided with through-cavity tubes which communicate with the corresponding cavities.

Compared with the prior art, the present invention has at least one of the following beneficial effects: (1) The two coating rollers drive the corresponding coating brushes to evenly coat the gauze between the two brushes under the operation of the driving unit; the coating rollers rotate and drive the coating brushes to uniformly brush the paint on the gauze, so as to prevent the phenomenon of little or no paint locally on the gauze under the action of gravity that would reduce the service life of the gauze.

(2) Under the action force generated by spring deformation arranged in the present invention, the upper coating roller presses the gauze tightly onto the lower coating roller, which ensures that the two coating rollers are in close contact with the gauze, and the lower coating roller plays a supporting role on the gauze, thereby solving the problem of gauze bending and warping when the upper and lower coating rollers are pressing against the gauze.

(3) The excess paint on the gauze falls into the hold-down plate under the action of gravity or after being rotably coated by the coating roller, and the paint falling on the inclined plane in the U-shaped area of the hold-down plates slides into the collection groove, and then flows into the collection box along the inclined groove surface under the action of gravity, thus reducing waste of paint.

(4) According to the present invention, the left heating plates outnumber the right heating plates, so that the environment temperature of the gauze is gradually reduced when it is moving, which facilitates the subsequent cooling and avoids deformation and damage due to large temperature difference caused by direct cooling after curing; meanwhile, a plurality of separation strips arranged on the conveyor belt separate the gauze from the conveyor belt, so as to avoid the direct contact between the two from affecting the curing effect of the gauze, facilitate the curing of the gauze circumferentially by the heating plates, and ensure the curing effect of the overall coating on the gauze.

BRIEF DESCRIPTION OF THE DRAWINGS

In order to further explain the embodiment of the present invention or the technical scheme in the prior art, the figures needed in the description of the embodiment or the prior art will be briefly introduced below. Obviously, the figures described below are only the embodiment of the present invention, and other figures may be obtained from the accompanied figures provided without any creative effort by those of ordinary skill in the art.

The corresponding reference numeral parts in the drawings are.

1. Mounting plate; 2. Side plate; 3. Coating mechanism; 30. Base plate; 31. No.1 lifting groove; 32. Hold-down plate; 33, Traverse groove; 34. No.1 L-shaped plate; 35. Traverse plate; 350. No.2 L-shaped plate; 36. Coating shaft; 360. Coating brush; 37. Matching group; 370. Slider groove; 371. Movable column; 372. Rectangular plate; 373. Spring; 374. Limit bolt; 375. Synchronization column; 38. Driving unit; 380. Driving gear; 381. Rack plate; 382. Telescopic rod; 39. Auxiliary group; 390. Supporting roller; 391. Collection groove; 392. Collection box; 4. Curing mechanism; 40. Rotating drum; 41. Heating plate; 42. Gear shaft; 43. Transmission gear; 44. Rotating teeth; 45. Placing plate; 46. Rotating shaft; 47. Conveyor belt; 48. Separation strip; 5. Cooling mechanism; 50. Bottom plate; 51. No.2 lifting groove; 52. Through groove; 53. Through-cavity tube.

DETAILED DESCRIPTION

The specific implementation method of the present invention will be described in further detail below in conjunction with the accompanied figures and embodiments. To further understand the present invention, many specific details are set forth in the following description. However, the present invention can be implemented in many other ways different from those described here, and those skilled in the art can make several improvements and modifications without departing from the technical principles of the present invention. So the scope of the present invention is not limited by the specific embodiments disclosed below.

The high-concealment gauze in this embodiment is mainly used for outdoor tents. The high-concealment gauze is formed by superposing and fixing the first gauze and the second gauze. The first gauze is provided with a first hole, with the aperture of 0.8 mm, and its light dyeing index is 43%. The second gauze is provided with a second hole, with the aperture of 3 mm, and the light dyeing index is 20.88%.

Figure 1:
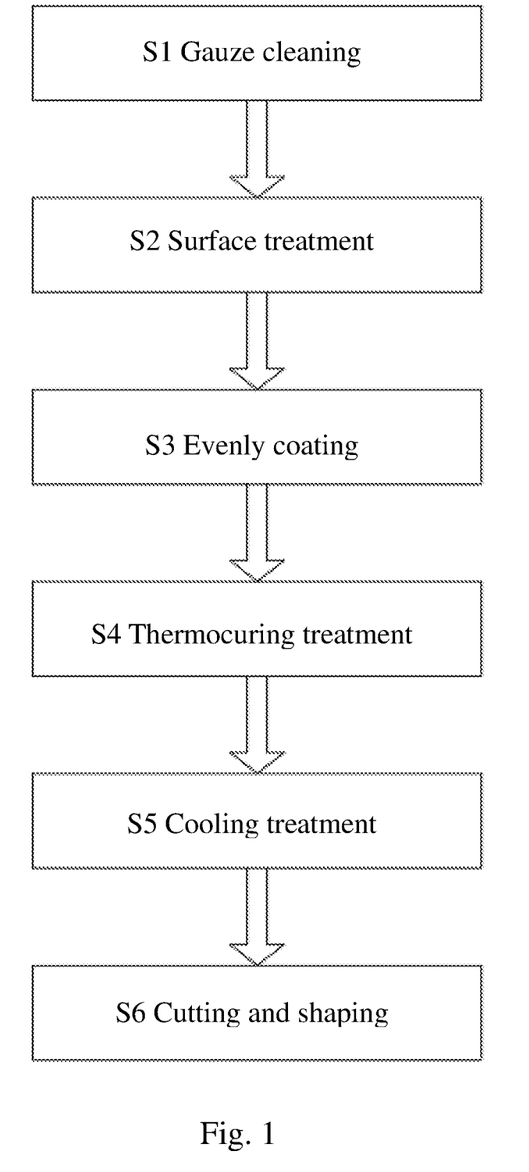
FIG. 1 is a flowchart of the high-concealment gauze processing technology provided according to the embodiment of the present invention.
Figure 2:
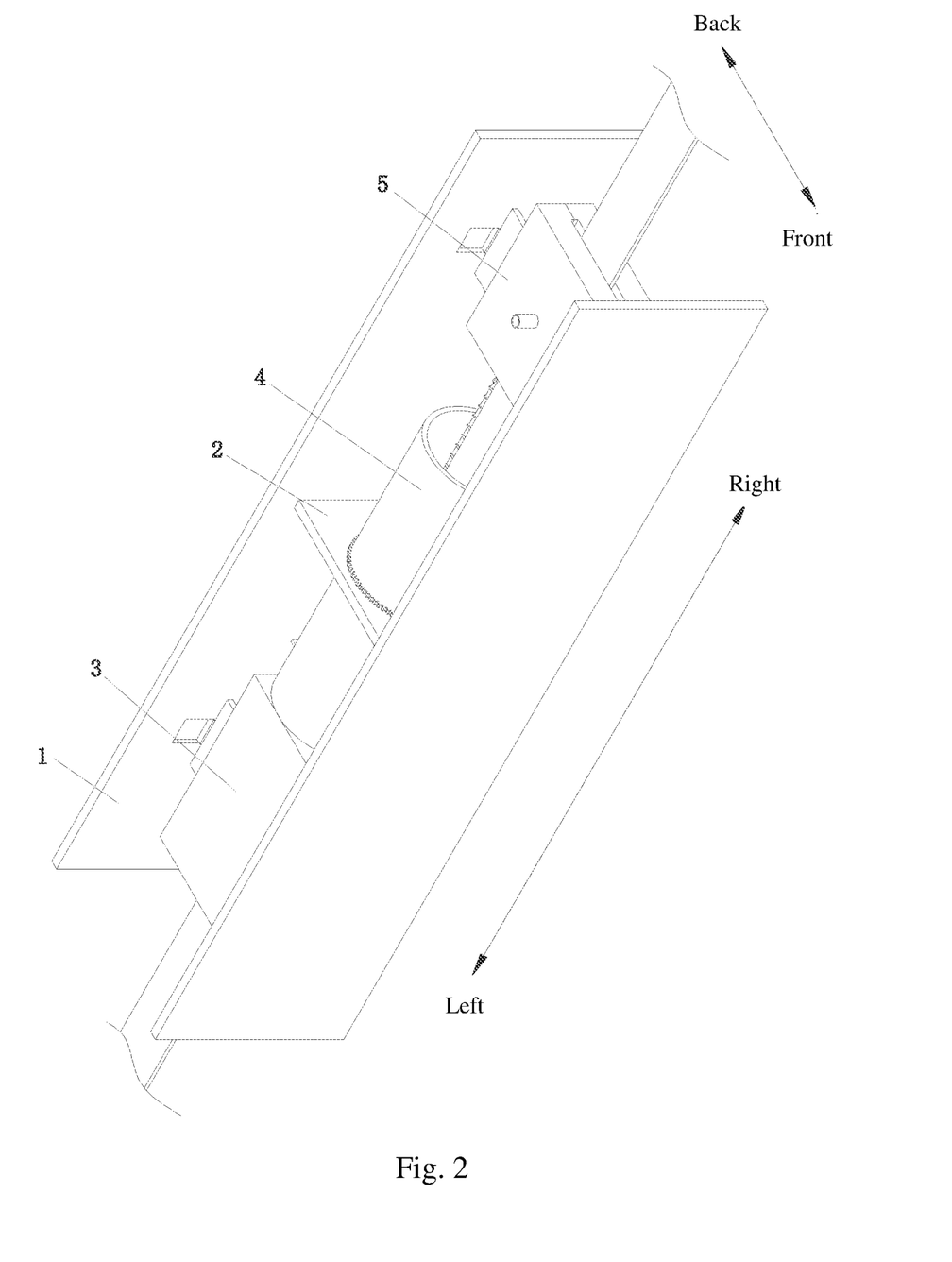
FIG. 2 is a schematic diagram of the three-dimensional structure of the integrated device provided according to an embodiment of the present invention.
Figure 3:
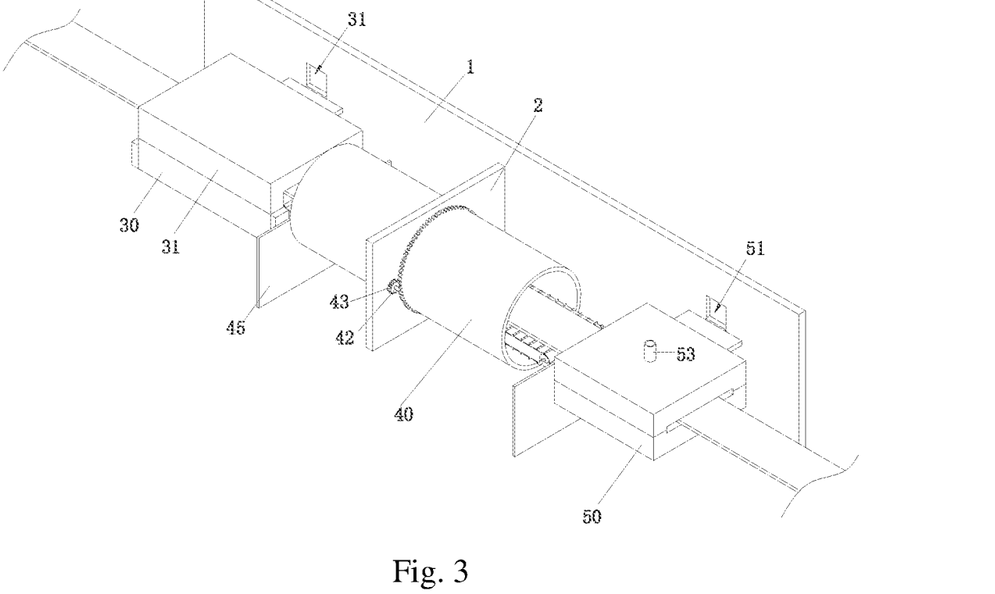
FIG. 3 is a schematic diagram of the three-dimensional structure of the mounting plates, side plates and No.1 lifting groove provided according to an embodiment of the present invention.

As shown in FIG. 1-3, a high-concealment gauze processing technology used for tents, comprises the steps of:

S1. gauze cleaning: cleaning the formed high-concealment gauze to remove dust, dirt or impurities attached to it;

S2. surface treatment: paint spraying the surface of the high-concealment gauze cleaned in step S1 to improve its water resistance and corrosion resistance;

S3. evenly coating: evenly coating the high-concealment gauze sprayed with paint in step S2, so that the paint is evenly sprayed on the high-concealment gauze to ensure the integrity of the coating;

S4. thermocuring treatment: sending the high-concealment gauze after the surface treatment in step S3 into an oven for thermocuring treatment at the specified temperature for the specified time, which is conductive to enhancing the strength and stability of the high-concealment gauze;

S5. cooling treatment: cooling the high-concealment gauze after the thermocuring treatment in step S4 to facilitate the subsequent cutting and trimming;

S6. cutting and shaping: cutting and shaping the high-concealment gauze cooled in step S5 by using a cutting mechanism to obtain the high-concealment gauze with the required size and shape;

wherein S3, S4 and S5 are completed with an integrated device, and the integrated device comprises:

a mounting plate 1, wherein the two mounting plates 1 are symmetrically arranged in front and back, and a side plate 2 is fixedly arranged between the two mounting plates 1;

a coating mechanism 3, wherein the coating mechanism 3 for uniformly coating the gauze is arranged between the two mounting plates 1, and the coating mechanism 3 is located on the left side of the side plate 2;

a curing mechanism 4, wherein the side plate 2 is provided with the curing mechanism 4;

a cooling mechanism 5, wherein the cooling mechanism 5 is arranged between the two mounting plates 1 and is located on the right side of the side plate 2;

During operation, the coated gauze is transported to the coating mechanism 3 by an external conveying device (not shown in the figure), and then passes through the curing mechanism 4 and the cooling mechanism 5. During this process, the coating mechanism 3 works to evenly distribute the coating on the high-concealment gauze, and then the curing mechanism 4 cures the paint on the high-concealment gauze to form a coating on the gauze. Finally, the cooling mechanism 5 cools the cured high-concealment gauze for subsequent cutting and trimming operations.

Figure 4:
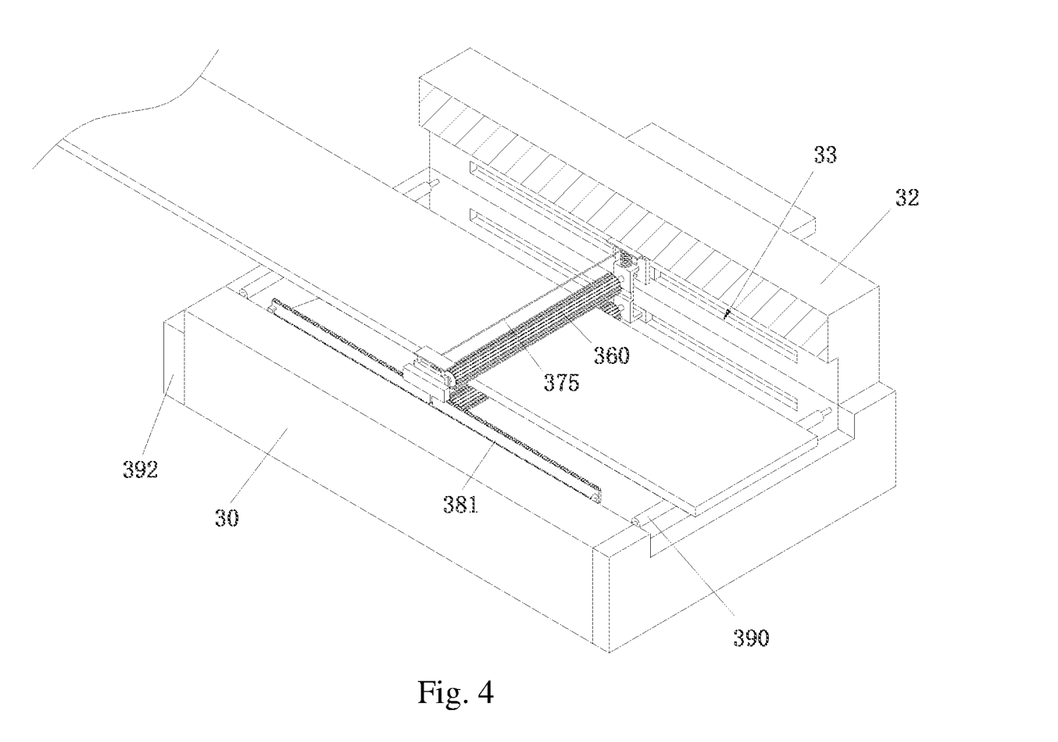
FIG. 4 is a sectional view of the three-dimensional structure among the hold-down plate, the base plate and the rack plate provided according to an embodiment of the present invention.
Figure 5:
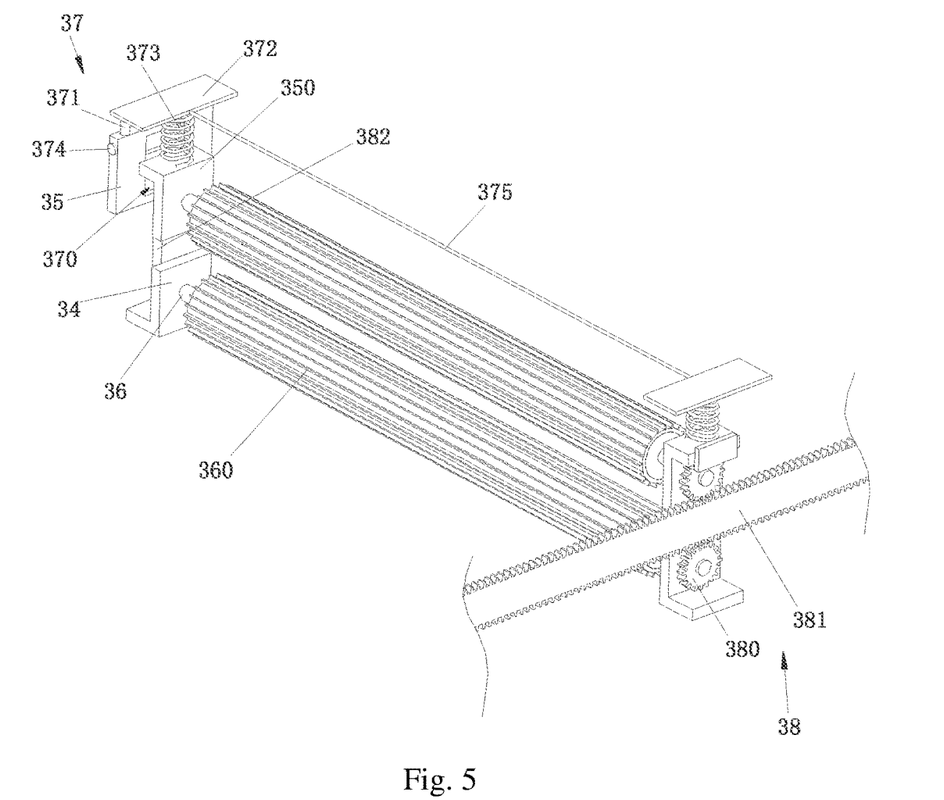
FIG. 5 is a schematic diagram of the three-dimensional structure among the No.1 L-shaped plate, No.2 L-shaped plate and the driving unit provided according to an embodiment of the present invention.

As shown in FIG. 4-5, the coating mechanism 3 comprises a base plate 30, and the U-shaped base plate 30 is fixedly arranged between the two mounting plates 1 through a fixing block, with the U-shaped opening of the base plate 30 facing upwards, the opposite faces of the two mounting plates 1 are both provided with a No.1 lifting groove 31, and an electric slider I is slidably arranged in the No.1 lifting groove 31, a U-shaped hold-down plate 32 is fixedly arranged between the two electric sliders I, with the U-shaped opening of the hold-down plate 32 facing downwards, the opposite surface of the vertical part of the base plate 30 and the opposite surface of the vertical part of the hold-down plate 32 are both provided with a traverse groove 33, a No.1 L-shaped plate 34 is slidably arranged in the traverse groove 33 on the base plate 30 through an electric slider II, a traverse plate 35 is slidably arranged in the traverse groove 33 on the hold-down plate 32 through a traverse block, and a No.2 L-shaped plate 350 is arranged on the opposite surfaces of the two traverse plates 35, and a coating shaft 36 is rotatably arranged between the two No.1 L-shaped plates 34 and between the two L-shaped plates 350, a coating roller is fixedly sleeved on the coating shaft 36, and a coating brush 360 is fixedly arranged on the coating roller.

As shown in FIG. 5, a matching group 37 is arranged on the traverse plate 35, and the matching group 37 comprises a slider groove 370, the opposite surfaces of the two traverse plates 35 are both provided with slider grooves 370, and the slider groove 370 is connected with the corresponding No.2 L-shaped plate 350 through a slider, two movable columns 371 distributed left and right are movably installed on the upper end face of the traverse plate 35, a rectangular plate 372 is jointly and fixedly arranged on the upper end faces of the two movable columns 371, a spring 373 is jointly and fixedly arranged between the rectangular plate 372 and the No.2 L-shaped plate 350 directly below, the left end face of the traverse plate 35 is provided with a threaded groove, and the threads in the threaded groove is matched with a limit bolt 374 for fixing the moving column 371, and a synchronization column 375 is fixedly arranged between the two rectangular plates 372.

As shown in FIG. 4-5, a driving group 38 is jointly arranged between the two coating shafts 36, and the driving group 38 comprises a driving gear 380, the coating shaft 36 are located on the front side of the No.1 L-shaped plate 34 or the No.2 L-shaped plate 350, and is sleeved with the driving gear 380, a rack plate 381 is fixedly arranged at the rear end face of the vertical part at the front side of the base plate 30 through two Z-shaped plates distributed left and right, the rack plate 381 are provided with teeth on the upper and lower end faces that mesh with the corresponding driving gear 380, and a telescopic rod 382 is fixedly arranged between the traverse plate 35 and the No.1 L-shaped plate 34 directly below it.

Figure 6:
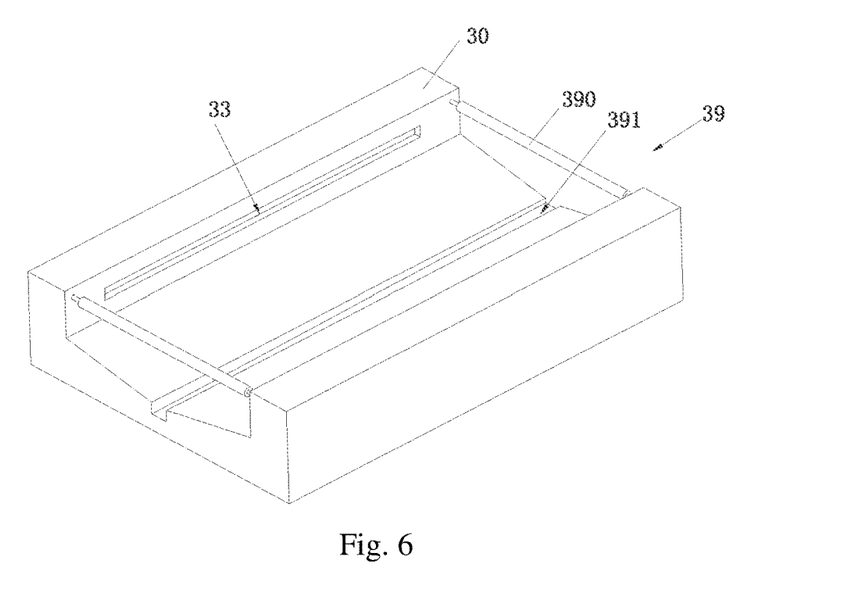
FIG. 6 is a schematic diagram of the three-dimensional structure among the base plate, the supporting roller and the collection groove provided according to an embodiment of the present invention.

As shown in FIG. 4-6, an auxiliary group 39 is arranged on the hold-down plate 32, and the auxiliary group 39 comprises a supporting roller 390, the U-shaped area of the hold-down plate 32 is rotatably arranged with two supporting shafts distributed left and right, and the supporting shafts are fixedly sleeved with the supporting rollers 390 for supporting the gauze, the right end face of the hold-down plate 32 is fixedly provided with a U-shaped baffle, the lower end faces of the U-shaped area of the hold-down plate 32 are two inclined faces which are symmetrical in front and back, and both are inclined towards the middle area, the lower end face of the U-shaped area of the hold-down plate 32 is provided with a collection groove 391, and the collection groove 391 inclines upward from left to right, and the left end face of the hold-down plate 32 is fixedly provided with a collection box 391 which matches the collection groove.

During operation, the two electric sliders I drive the hold-down plate 32 to move up for placing the high-concealment gauze to be evenly coated. After the high-concealment gauze is placed in the right position, the two electric sliders I drive the hold-down plate 32 to move down and overlap with the base plate 30; and during the initial downward movement of the hold-down plate 32, the upper coating roller moves down synchronously with the hold-down plate 32 and contacts the gauze, that is, the two coating rollers are on the upper and lower sides of the gauze and in contact with the gauze; the spring 373 is initially in a compressed state, so the No.2 L-shaped plate 350 tends to move to the No.1 L-shaped plate 34 through the deformation of the spring 373, that is, when both coating rollers are in contact with the gauze, the upper coating roller presses the gauze tightly onto the lower coating roller under the action force generated by spring deformation, which ensures that the two coating rollers are in close contact with the gauze, and the lower coating roller plays a supporting role on the gauze, thereby solving the problem of gauze bending and warping when the upper and lower coating rollers are pressing against the gauze.

Through the cooperation between the movable column 371 and the limit bolt 374 realized by limiting and fixing the movable column 371 at the specified height by tightening the limit bolt 374, and the synchronization column 375 arranged enables the front and rear rectangular plates 372 to move synchronically, thus changing the spacing between the rectangular plate 372 and the corresponding No.1 L-shaped plate 34, that is, changing the force generated by the subsequent shrinkage of the spring 373, so that the upper coating roller is adapted to compress different gauze thicknesses while avoiding any damage to the gauze caused by the excessive compression of the upper coating roller.

After that, the electric slider II drives the traverse plate 35 to move from left to right, and the No.2 L-shaped plate 350 and the No.1 L-shaped plate 34 move synchronously driven respectively by the traverse plate 35 and telescopic rod 382, so that the No.1 L-shaped plate 34 and No.2 L-shaped plate 350 drive the corresponding coating rollers to move synchronously, and in the moving process, the driving gear 380 and the teeth on the corresponding end face of the rack plate 381 mesh and rotate the driving gear 380, the driving gear 380 on the upper side rotates in the opposite direction to the driving gear 380 on the lower side, the driving gear 380 drives the coating roller to rotate synchronously through the coating shaft 36, and the rotating coating roller drives the coating brush 360 arranged on it to brush the coating evenly, so as to avoid reduction of the service life of the gauze due to patchy coating on the gauze under the action of gravity.

In the evenly coating process by the coating roller, the excess paint on the gauze falls into the hold-down plate 32 under the action of gravity or after being rotably coated by the coating roller, and the paint falling on the inclined plane in the U-shaped area of the hold-down plates 32 slides into the collection groove 391, and then flows into the collection box 392 along the inclined groove surface under the action of gravity, thus reducing the waste of paint, and the supporting roller 390 arranged plays a supporting role for the evenly coating of the gauze and prevents the gauze from collapsing due to its own gravity.

Figure 7:
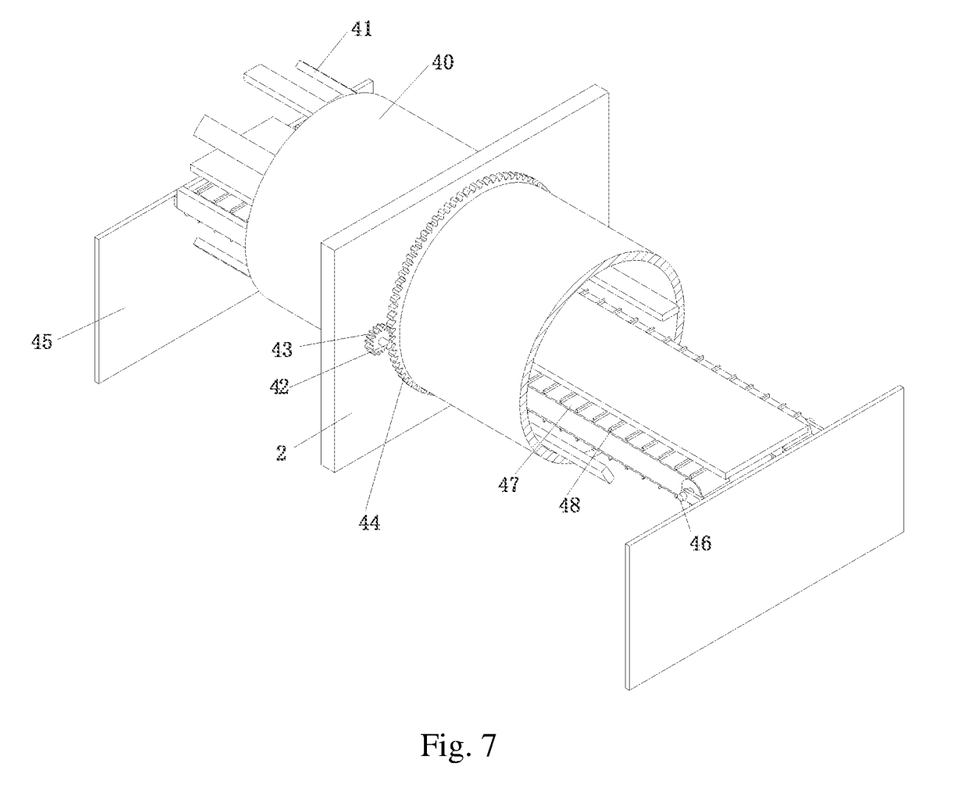
FIG. 7 is a sectional view of the three-dimensional structure of the curing mechanism provided according to an embodiment of the present invention.

As shown in FIG. 2 and FIG. 7, the curing mechanism 4 comprises a rotating drum 40, and the side plate 2 is rotatably arranged with the horizontally placed cylindrically shaped rotating drum 40, two curing groups are fixedly arranged on the inner wall of the rotating drum 40, and the two curing groups are located on both sides of the side plate 2 respectively, and the curing groups include a plurality of heating plates 41 evenly distributed circumferentially, and the left heating plates 41 outnumber the right heating plates 41, the right end surface of the side plate 2 is rotatably provided with a gear shaft 42, and a transmission gear 43 is fixedly sleeved on the gear shaft 42, and the rotating drum 40 is circumferentially and fixedly provided with a circle of rotating teeth 44 which are meshed with the transmission gear 43.

As shown in FIG. 7, the two mounting plates 1 are fixedly arranged with the two placing plates 45 distributed left and right, and the two placing plates 45 are located on both sides of the rotating drum 40, the opposite faces of the two placing plates 45 are fixedly provided with two mounting blocks which are symmetrical in front and back, and the two mounting blocks symmetrical in front and back are jointly and rotatably provided with a rotating shaft 46, the rotating shaft 46 is fixedly sleeved with two rotating rollers which are symmetrical in front and back, and the left and right rotating rollers are jointly provided with a high-temperature resistant conveyor belt 47, and the outer side surface of the conveyor belt 47 is fixedly provided with a plurality of separation strips 48 arranged at equal distances.

Figure 8:
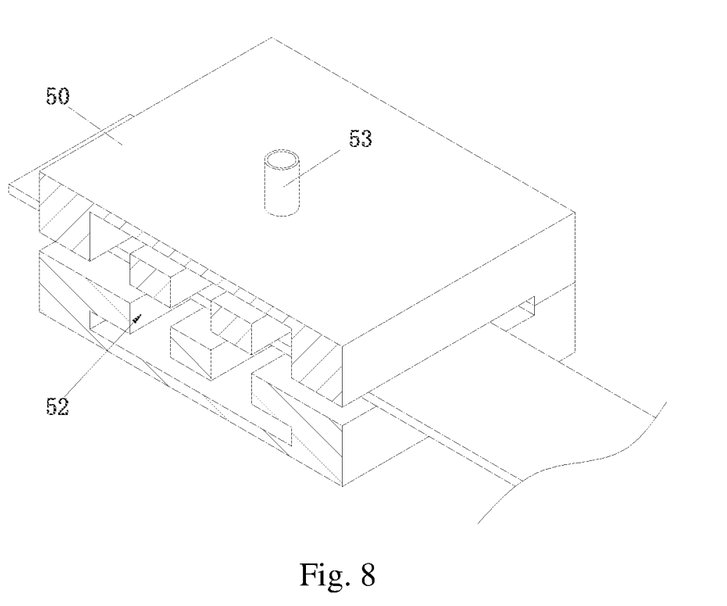
FIG. 8 is a sectional view of the three-dimensional structure of the cooling mechanism provided according to an embodiment of the present invention.

As shown in FIG. 8, the cooling mechanism 5 comprises a bottom plate 50, the two mounting plates 1 are arranged in between with two bottom plates 50 which are symmetrical up and down, and the lower bottom plate 50 is fixedly connected with the mounting plate 1 through a rectangular block, the opposite faces of the two mounting plates 1 are both provided with a No.2 lifting groove 51, and an electric slider III is slidably arranged in the No.2 lifting groove 51, the two electric sliders are fixedly connected with the upper bottom plate 50 through a connecting block, the bottom plate 50 has an internal cavity structure, the opposite faces of the two bottom plates 50 are provided with a plurality of through grooves 52 communicating with the corresponding cavities, and the upper and lower through grooves 52 are staggered, and the opposite surfaces of the two bottom plates 50 are fixedly provided with through-cavity tubes 53 which communicate with the corresponding cavities, and the through-cavity tubes and through-cavity tubes 53 are connected with the external air pumps.

During operation, when the paint is moved into the curing mechanism 4 by the evenly coated gauze, the external motor I drives the gear shaft 42 to rotate forward, and the gear shaft 42 drives the transmission gear 43 to rotate synchronously, so that the rotating drum 40 rotates reversely through the engagement between the transmission gear 43 and the teeth on the rotating drum 40, and meanwhile, the heating plate 41 in the rotating drum 40 is electrified to generate heat, so that the gauze passing through the rotating drum 40 is heat and cured circumferentially; and the left heating plates outnumber the right heating plates, so that the environment temperature of the gauze is gradually reduced when it is moving, which facilitates the subsequent cooling and avoids the phenomenon of deforming and damaging due to large temperature difference caused by direct cooling after curing.

And in this process, the external motor 2 works synchronously and drives the rotating shaft 46 on the left side to rotate forward synchronously, so the rotating shaft 46 drives the conveyor belt 47 to work through the rotating roller, and the conveyor belt 47 drives the gauze placed on it to move to the right, and a plurality of separation strips 48 arranged on the conveying belt 47 separate the gauze from the conveyor belt 47 to avoid direct contact between the two and affect the curing effect of the gauze, and the two conveyor belts 47 cooperate to reduce the contact with the gauze while driving the gauze to move rightward, which facilitates the heating plate 41 to cure the whole circumference of the gauze and ensures the curing effect of the coating on the gauze.

At first, the electric slider III drives the upper bottom plate 50 to move away from the lower bottom plate 50 for the convenience of placing the gauze in the U-shaped area of the two bottom plates 50; then the electric slider III works to reset the upper bottom plate 50, so the two bottom plates 50 are attached to each other. When the cured gauze is sent to between the two bottom plates 50, two external air pumps work, with the lower one pumping gas in, and the upper one pumping gas out, so the airflow on the lower side reaches the gauze after passing through the through groove 52 of the lower bottom plate 50, takes away the heat on the gauze, and finally flows into the inner cavity of the upper bottom plate 50 through the through groove 52 of the upper bottom plate 50, and is pumped out by the external air pump. In this way, the gauze is cooled, and the through grooves 52 on different bottom plates 50 are staggered with each other to speed up the air flow in the U-shaped area of the two bottom plates 50, thus improving the overall cooling efficiency. After cooling, the gauze is conveyed by an external conveying device (not shown in the figure) for subsequent cutting and trimming.

Specifically, the coated gauze is conveyed to the integrated device by an external conveying device (not shown in the figure). After the high-concealment gauze is in the right position, the upper coating roller moves down synchronously with the hold-down plate 32 and contacts the gauze, that is, the two coating rollers are on the upper and lower sides of the gauze and in contact with the gauze. After that, the No.2 L-shaped plate 350 and the No.1 L-shaped plate 34 move synchronously driven respectively by the traverse plate 35 and telescopic rod 382, and in the moving process, the driving gear 380 and the teeth on the corresponding end face of the rack plate 381 mesh and rotate the driving gear 380, the driving gear 380 drives the coating roller to rotate synchronously through the coating shaft 36, and the rotating coating roller drives the coating brush 360 arranged on it to brush the coating evenly.

When the evenly coated gauze moves to the curing mechanism 4 and the cooling mechanism 5, the gear shaft 42 drives the transmission gear 43 to rotate synchronously, and the transmission gear 43 and the teeth on the rotating drum 40 mesh and reverse the rotating drum 40, and meanwhile, the heating plate 41 in the rotating drum 40 is electrified to generate heat, so that the gauze passing through the rotating drum 40 is heat and cured circumferentially; the cured gauze moves to the cooling mechanism 5, and two external air pumps work; the airflow on the lower side reaches the gauze after passing through the through groove 52 of the lower bottom plate 50, takes away the heat on the gauze, and finally, it flows into the inner cavity of the upper bottom plate 50 through the through groove 52 of the upper bottom plate 50, and is pumped out by the external air pump. After cooling, the gauze is conveyed by an external conveying device (not shown in the figure) for subsequent cutting and trimming.

In the description of the present invention, it should be understood that the orientation or positional relationship indicated by location words such as "front, back, upper, lower, left, right", "lateral, vertical, upright, horizontal" and "top, bottom" are usually based on the orientation or positional relationship shown in the attached figures, just for the convenience of describing the present invention and simplifying the description. Unless otherwise stated, these location words do not indicate or imply that the device or element referred to must have a specific orientation or be constructed and operated in a specific orientation, so they are not limiting the scope of protection of the present invention; and the locations word "inside and outside" refers to the inside and outside of the outline of each component.

Further, the terms "first", "second", "No.1" and "No.2" are only used for descriptive purposes, and cannot be understood as indicating or implying relative importance or implicitly indicating the number of indicated technical features. Therefore, the features defined as "first", "second", "No.1" and "No.2" can explicitly or implicitly include at least one of these features. In the description of the present invention, unless otherwise specifically defined, "a plurality of" means at least two, such as two, three, etc.

In the description of the present invention, it should also be explained that unless otherwise specified and limited, the terms "arranging", "connecting", "installing" and "lining" are of their generalized meanings. For example, it can be fixed connection, detachable connection or integrated connection; can be mechanical connection or electrical connection; can be direct connection or indirect connection through an intermediate medium; and can also be the connection inside two elements. For those of ordinary skill in the art, the specific meanings of the above terms in the present invention can be understood based on the specific situations.

The above are only the preferred embodiments of the present invention, but not to limit the scope of the present invention, and all equivalent changes made to the structure, shape and principle of the present invention should be regarded as the protection scope of the present invention.

What is claimed is:

1. A gauze processing method, using an integrated device, the method comprising the steps of:
   S1. gauze cleaning: cleaning the formed gauze to remove dust, dirt or impurities attached to it;
   S2. surface treatment: paint spraying the surface of the gauze cleaned in step S1 to improve its water resistance and corrosion resistance;
   S3. evenly coating: evenly coating, by a coating mechanism (3) of the integrated device, the gauze sprayed with paint in step S2, so that the paint is evenly sprayed on the gauze to ensure the integrity of the coating;
   S4. thermocuring treatment: sending the gauze after the surface treatment in step S3 into a curing mechanism (4) of the integrated device for thermocuring treatment at the specified temperature for the specified time, which is conductive to enhancing the strength and stability of the gauze;
   S5. cooling treatment: cooling, by a cooling mechanism (5) of the integrated device, the gauze after the thermocuring treatment in step S4 to facilitate the subsequent cutting and trimming;
   S6. cutting and shaping: cutting and shaping the gauze cooled in step S5 by using a cutting mechanism to obtain the gauze with the required size and shape;
   wherein S3, S4 and S5 are completed with the integrated device, and the integrated device comprises:
   two mounting plates (1), wherein the two mounting plates (1) are symmetrically arranged in front and back, and a side plate (2) is fixedly arranged between the two mounting plates (1);
   the coating mechanism (3), wherein the coating mechanism (3) for evenly coating the gauze is arranged between the two mounting plates (1), and the coating mechanism (3) is located on the left side of the side plate (2);
   the curing mechanism (4), wherein the side plate (2) is provided with the curing mechanism (4);
   the cooling mechanism (5), wherein the cooling mechanism (5) is arranged between the two mounting plates (1) and is located on the right side of the side plate (2);
   the coating mechanism (3) comprises a U-shaped base plate (30), and the U-shaped base plate (30) is fixedly arranged between the two mounting plates (1) through a fixing block, with the U-shaped opening of the base plate (30) facing upwards, the opposite faces of the two mounting plates (1) are both provided with a first lifting groove (31), and an electric slider I is slidably arranged in the first lifting groove (31), a U-shaped hold-down plate (32) is fixedly arranged between the two electric sliders I, with the U-shaped opening of the hold-down plate (32) facing downwards, the opposite surface of the vertical part of the base plate (30) and the opposite surface of the vertical part of the hold-down plate (32) are both provided with a traverse groove (33), a first L-shaped plate (34) is slidably arranged in the traverse groove (33) on the base plate (30) through an electric slider II, a traverse plate (35) is slidably arranged in the traverse groove (33) on the hold-down plate (32) through a traverse block, and a second L-shaped plate (350) is arranged on the opposite surfaces of the two traverse plates (35), and a coating shaft (36) is rotatably arranged between the two first L-shaped plates (34) and between the two L-shaped plates (350), a coating roller is fixedly sleeved on the coating shaft (36), and a coating brush (360) is fixedly arranged on the coating roller.

2. The gauze processing method according to claim 1, characterized in that a matching group (37) is arranged on the traverse plate (35), and the matching group (37) comprises a slider groove (370), the opposite surfaces of the two traverse plates (35) are both provided with slider grooves (370), and the slider groove (370) is connected with the corresponding second L-shaped plate (350) through a slider, two movable columns (371) distributed left and right are movably installed on the upper end face of the traverse plate (35), a rectangular plate (372) is jointly and fixedly arranged on the upper end faces of the two movable columns (371), a spring (373) is jointly and fixedly arranged between the rectangular plate (372) and the second L-shaped plate (350) directly below, the left end face of the traverse plate (35) is provided with a threaded groove, and the threads in the threaded groove is matched with a limit bolt (374) for fixing the moving column (371), and a synchronization column (375) is fixedly arranged between the two rectangular plates (372).

3. The gauze processing method according to claim 1, characterized in that a driving group (38) is jointly arranged between the two coating shafts (36), and the driving group (38) comprises a driving gear (380), the coating shaft (36) are located on the front side of the first L-shaped plate (34) or the second L-shaped plate (350), and is sleeved with the driving gear (380), a rack plate (381) is fixedly arranged at the rear end face of the vertical part at the front side of the base plate (30) through two Z-shaped plates distributed left and right, the rack plate (381) are provided with teeth on the upper and lower end faces that mesh with the corresponding driving gear (380), and a telescopic rod (382) is fixedly arranged between the traverse plate (35) and the first L-shaped plate (34) directly below it.

4. The gauze processing method according to claim 1, characterized in that an auxiliary group (39) is arranged on the hold-down plate (32), and the auxiliary group (39) comprises a supporting roller (390), the U-shaped area of the hold-down plate (32) is rotatably arranged with two supporting shafts distributed left and right, and the supporting shafts are fixedly sleeved with the supporting rollers (390) for supporting the gauze, the right end face of the hold-down plate (32) is fixedly provided with a U-shaped baffle, the lower end faces of the U-shaped area of the hold-down plate (32) are two inclined faces which are symmetrical in front and back, and both are inclined towards the middle area, the lower end face of the U-shaped area of the hold-down plate (32) is provided with a collection groove (391), and the collection groove (391) inclines upward from left to right, and the left end face of the hold-down plate (32) is fixedly provided with a collection box (391) which matches the collection groove.

5. The gauze processing method according to claim 1, characterized in that the curing mechanism (4) comprises a rotating drum (40), and the side plate (2) is rotatably arranged with the horizontally placed cylindrically shaped rotating drum (40), two curing groups are fixedly arranged on the inner wall of the rotating drum (40), and the two curing groups are located on both sides of the side plate (2) respectively, and the curing groups include a plurality of heating plates (41) evenly distributed circumferentially, and the left heating plates (41) outnumber the right heating plates (41), the right end surface of the side plate (2) is rotatably provided with a gear shaft (42), and a transmission gear (43) is fixedly sleeved on the gear shaft (42), and the rotating drum (40) is circumferentially and fixedly provided with a circle of rotating teeth (44) which are meshed with the transmission gear (43).

6. The gauze processing method according to claim 5, characterized in that the two mounting plates (1) are fixedly arranged with the two placing plates (45) distributed left and right, and the two placing plates (45) are located on both sides of the rotating drum (40), the opposite faces of the two placing plates (45) are fixedly provided with two mounting blocks which are symmetrical in front and back, and the two mounting blocks symmetrical in front and back are jointly and rotatably provided with a rotating shaft (46), the rotating shaft (46) is fixedly sleeved with two rotating rollers which are symmetrical in front and back, and the left and right rotating rollers are jointly provided with a high-temperature resistant conveyor belt (47), and the outer side surface of the conveyor belt (47) is fixedly provided with a plurality of separation strips (48) arranged at equal distances.

7. The gauze processing method according to claim 1, characterized in that the cooling mechanism (5) comprises a bottom plate (50), the two mounting plates (1) are arranged in between with two bottom plates (50) which are symmetrical up and down, and the lower bottom plate (50) is fixedly connected with the two mounting plates (1) through a rectangular block, the opposite faces of the two mounting plates (1) are both provided with a second lifting groove (51), and an electric slider III is slidably arranged in the second lifting groove (51), the two electric sliders are fixedly connected with the upper bottom plate (50) through a connecting block, the bottom plate (50) has an internal cavity structure, the opposite faces of the two bottom plates (50) are provided with a plurality of through grooves (52) communicating with the corresponding cavities, and the upper and lower through grooves (52) are staggered, and the opposite surfaces of the two bottom plates (50) are fixedly provided with through-cavity tubes which communicate with the corresponding cavities.

* * * * *